United States Patent [19]
Kuipers et al.

[11] Patent Number: 4,912,660

[45] Date of Patent: Mar. 27, 1990

[54] METHOD AND APPARATUS FOR MEASUREMENTS OF A CHARACTERISTIC OF AN OBJECT USING A SENSED SIGNAL AND AN AUXILIARY VARIABLE SIGNAL APPLIED TO THE OBJECT

[75] Inventors: Ulrich Kuipers, Hatzenbergstrasse 32, 5960 Olpe; Michael Denker, Am Spielplatz 6, 5439 Bad Marienberg; Karl W. Bonfig, Asternweg 17, 5910 Kreuztal, all of Fed. Rep. of Germany

[73] Assignees: Ulrich Kuipers, Olpe; Michael Denker, Bad Marienberg; Karl Walter Bonfig, Kreutzal, all of Fed. Rep. of Germany

[21] Appl. No.: 133,397

[22] Filed: Dec. 15, 1987

[30] Foreign Application Priority Data

Dec. 15, 1986 [DE] Fed. Rep. of Germany ....... 3642771

[51] Int. Cl.[4] ..................... G06F 15/20; G01K 19/00
[52] U.S. Cl. ................................ 364/550; 364/481; 364/574; 364/575; 324/76 R; 340/657
[58] Field of Search ............... 364/550, 581, 481, 574, 364/575; 324/76 R, 98, 105, 158 R; 340/657, 658, 660, 664

[56] References Cited

U.S. PATENT DOCUMENTS

| | | | |
|---|---|---|---|
| 4,287,769 | 9/1981 | Buckley | 364/550 |
| 4,575,810 | 3/1986 | Stoub | 364/581 |
| 4,651,291 | 3/1987 | Nishimura | 364/550 |
| 4,672,566 | 6/1987 | Asano et al. | 364/550 |
| 4,800,513 | 1/1989 | Deutsch | 364/550 |

FOREIGN PATENT DOCUMENTS

| | | |
|---|---|---|
| 2816655 | 10/1979 | Fed. Rep. of Germany . |
| 3015519 | 10/1981 | Fed. Rep. of Germany . |
| 3106530 | 9/1982 | Fed. Rep. of Germany . |
| 3333129 | 6/1984 | Fed. Rep. of Germany . |

OTHER PUBLICATIONS

C. J. Wiles, "Mini—Sosie: New Concept in High Resolutions Seismic", The Oil and Gas Journal, Mar. 12, 1979, pp. 94-97.

W. D. T. Davis, System Identification for Self—Adaptive Control, "Chapter 3, The Generation and Properties of Binary Maximum Length Sequences", 1970.

Profos: Handbuch der Industriellen Messtechnik, pp. 133-135; pp. 298-302, 1984.

Primary Examiner—Parshotam S. Lall
Assistant Examiner—Brian M. Mattson
Attorney, Agent, or Firm—Spencer & Frank

[57] ABSTRACT

An apparatus for measuring a measurable characteristic of an object includes a sensor element which emits an analog sensor output signal, the sensor output signal corresponding to the measurable characteristic of the object, an analog/digital converter for converting analog signals from the sensor element into digital output signals, a processor receiving the digital output signals and supplying a control signal to the controllable auxiliary variable generator. The controllable auxiliary variable generator is controlled by the control signal emitted by the processor, and the auxiliary variable signal is interrupted for a selected time span after each measuring interval. The processor filters out components of the measurable signal emitted by the sensor element which are caused by the auxiliary variable signal, by analyzing the signal produced by the controllable auxiliary variable signal generator together with the output signals from the analog/digital converter to form a resultant function, so that the processor can determine an accurate value of the measurable characteristic of the object.

23 Claims, 12 Drawing Sheets

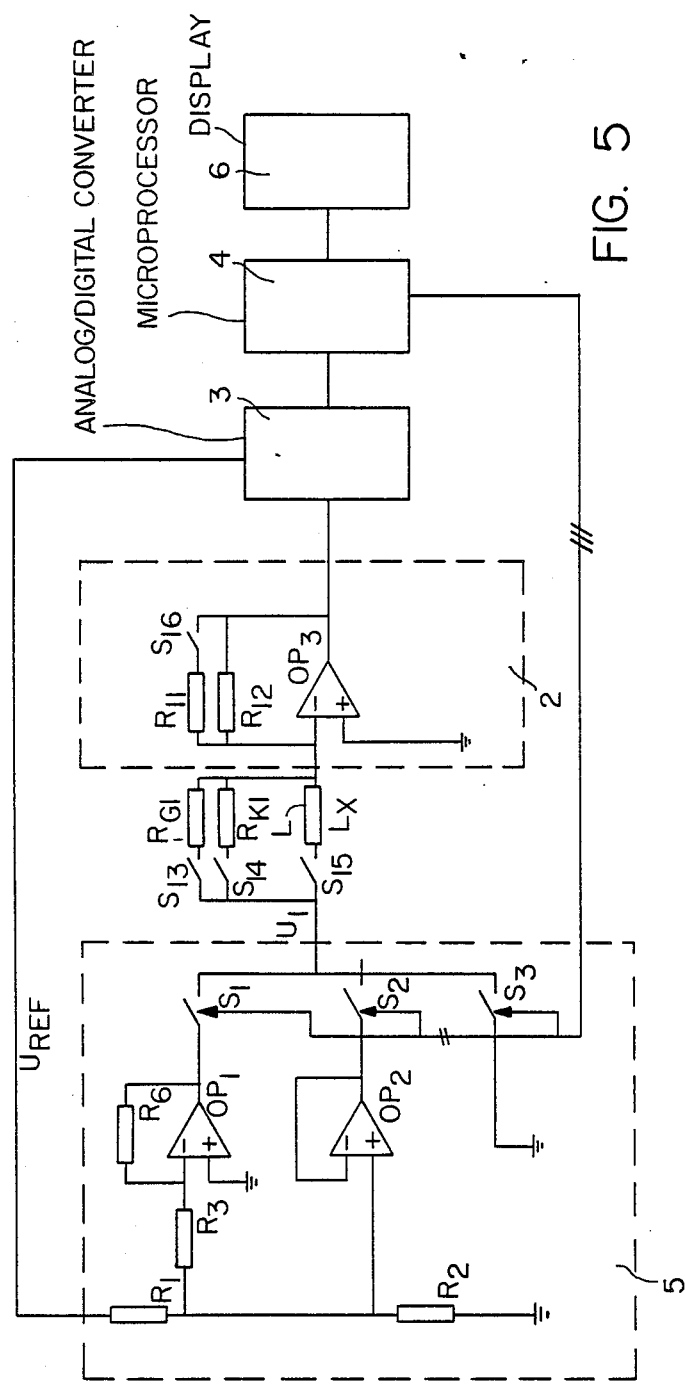

METHOD AND APPARATUS FOR MEASUREMENTS OF A CHARACTERISTIC OF AN OBJECT USING A SENSED SIGNAL AND AN AUXILIARY VARIABLE SIGNAL APPLIED TO THE OBJECT

BACKGROUND OF THE INVENTION

The invention relates to a method of measuring a measurable characteristic, of an object to be measured to which an auxiliary variable is applied and which is coupled with a measured value pickup or sensor element which emits a directly measurable, analog measurement signal corresponding to the measurable variable, with a conclusion being made as to the measurable variable from the auxiliary variable and from the measurement signal. The invention also relates to use of the method for measuring electrical and non-electrical variables and to an apparatus for implementing the method.

A method of the mentioned type for measuring nonelectrical variables is disclosed in DE-OS No. 3,333,129 in which the non-electrical variable, such as force, pressure and temperature, is measured by way of the deformation of a conductor, with the variable to be measured acting on an interdigital transducer which receives a coded acoustic surface wave that is decoded by means of correlation reception and evaluated with respect to its correlation maximum. The coded surface wave signal may be a binary phase keyed signal or a chirp signal. For this purpose, two interdigital transducers are applied to a piezoelectric substrate, one transducer being configured as a signal transmitter and the other transducer as a filter for the reception of the transmitted signal. The receiving filter constitutes a matched filter for the transmitted signal and is configured to receive, by respective weighting of the transducer, either the binary phase keyed signal or the linearly frequency modulated chirp signal. If no non-electrical measurable variables act on the interdigital transducer structure of the matched filter, the autocorrelation function with major and minor peak ratio is measured at the output of the filter. If, however, corresponding measurable variables do act on the interdigital transducer, the geometry of the transducer and consequently the transfer function of the transducer are changed and the signal generated by the transmitting transducer is received in a mismatched way. This is expressed in a reduction of the autocorrelation maximum and can thus be evaluated electrically.

A method of determining momentary flow rates is known from Published Patent Application No. (without examination) DE 3,106,530 A1. Here, pseudo-randomly marked flow medium particles are utilized for transit time measurements. For this purpose, the position of the maximum of a cross-correlation function is employed.

The publication by W. D. T. Davies, entitled, "System Identification for Self-Adaptive Control," John Wiley and Sons, Ltd. London, 1970, discloses pseudo-random signals of maximum length. MBS signals are known from A. Van den Bos, "Construction of Binary Multifrequency Test Signals," IFAC Symp., Prague, 1967.

DE-OS No. 3,015,519 discloses a method of determining the capacitance of an object being measured to which an interfering direct voltage is additionally applied and in which the time constant fixed by a charging or discharging process is determined, and from it, the desired capacitance is determined. The determination of the time constant is performed by three current measurements with the second measurement beginning in an integrating manner when two measuring resistors are connected to the object to be measured. A circuit arrangement composed of a dipole including the two measuring resistors serves to implement this method with a switch associated with the measuring resistors being provided in the dipole to permit the selective connection of the respective measuring resistor. The two measuring resistors may here be connected either in parallel and activated by a switch, or they may be connected in series and one of the measuring resistors may be selectively bridged by a switch.

Also known are methods and apparatus for measuring resistances, capacitances and inductances, with such methods and apparatus being divided, in principle, into four different groups:

1. The value of the component to be analyzed is determined by means of a bridge circuit. In this method, disclosed in the publication "Profos: Handbuch der industriellen Messtechnik" [Profos: Handbook of Industrial Measuring Technology], published by Vulkan-Verlag Essen; 3rd Edition, Essen, 1984, the supply voltage for the bridge circuit is composed either of a sinusoidal voltage or of a direct voltage. The measured value may be determined by matching the bridge or from the bridge voltage. The problem in this method is that the supply voltage must either have a very good sinusoidal shape with constant amplitude and frequency, i.e. a low harmonic distortion factor, or it must be designed as an accurate direct voltage free of drifts.

2. The component to be measured is installed in an oscillator as a frequency determining element. In this method, which is disclosed, for example, in DE-OS No. 2,816,655, there exists the drawback that the frequency of the oscillator must be constant during the measuring period while it may vary from measurement to measurement.

3. The component to be measured is connected with a known component to form a delay member so as to provide a conclusion as to the value of the component to be measured from the charging process and/or the discharging process, as disclosed, for example, in the above-mentioned DE-OS No. 3,015,519. Here, either the time is measured until the current in the circuit or the voltage across the circuit has reached a certain value, or the current in the circuit or the voltage across the circuit is measured after a fixed time. The drawback is that an offset in the measured variable cannot be eliminated or only imprecisely determined, a noise component contained in this variable, such as a drift, which occurs linearly over time, is not eliminated and sometimes very long measuring times must be accepted.

4. The impedance of the component to be measured is determined, in which case similar problems arise as in the measuring method mentioned under Point 1.

SUMMARY OF THE INVENTION

It is an object of the present invention to provide a method of measuring the measurable variable of an object in which the measurable variable can be determined at low expense and with high accuracy by the positive application of digital technology and, in particular, measuring inaccuracies, such as measuring circuit tolerances and the influence on the resulting measurement of superposed interference variables, such as, for example, offset influences, drifts or the like, are eliminated and the resulting measurement can be displayed directly.

This problem is solved according to the invention in that the auxiliary variable has the time characteristic of a pseudo-random noise signal which is emitted by a controllable auxiliary variable generator controlled by a control signal from a processor and is interrupted for a predeterminable time span after each measuring interval; the analog measurement signal is fed to the processor as a digitalized measurement signal via an analog/-digital converter (ADC); the components of the measurable variable or of the measurement signal resulting from the known auxiliary variable are filtered out and the measurable variable is determined only from the components of the measurement signal resulting from the auxiliary variable in that the control signal emitted by the processor is processed together with the measurement signal into a function similar to a cross-correlation function with the auxiliary variable and the function similar to a cross-correlation function being such that the effects produced by offset variables are eliminated, and the values of the function similar to a cross-correlation function employed to determine the measurable variable are evaluated in such a manner that the influence of a linear component contained in the measurement signal on the resulting measurement is eliminated.

The solution according to the invention permits the determination of the measurable variable of any desired selected phenomenon to be measured at low expense and with high accuracy by the positive application of digital technology. Measuring inaccuracies, in particular, such as measuring circuit tolerances and unavoidable interfering variables, such as offset influences, drifts and the like, are eliminated, and it is possible to directly evaluate and display the determined resulting measurement.

An apparatus for implementing the method according to the invention is intended, while incorporating the above-mentioned object, to solve the additional problem of configuring it of few components, making it easily miniaturizable and thus integratable in sensors.

This is accomplished by the invention in that a microprocessor is provided whose output is connected, on the one hand, with a display device and, on the other hand, with the auxiliary variable generator so as to furnish control signals to the auxiliary variable generator; the output of the auxiliary variable generator feeds an auxiliary variable to the object being measured with the object being connected with a measured value pickup or sensor element to pick up the measured value; the output of the measured value pickup or sensor element is connected with the input of an analog/digital converter for outputting out the measurement signal, the analog/digital converter additionally furnishing a reference voltage to the auxiliary variable generator, and the output of the analog/digital converter is connected with the input of the microprocessor.

This solution according to the invention provides an apparatus for determining the measuring variable of any desired object to be measured at low expense, and with high accuracy by the positive application of digital technology in which measuring inaccuracies are eliminated and the resulting measurement can be displayed directly, while simultaneously it is possible to miniaturize the measuring device and thus integrate it in sensors.

The method according to the invention and the apparatus according to the invention are particularly suitable for the electric measurement of non-electric variables in conjunction with capacitive, inductive, resistive, magnetic, electrical and/or optical measured value pickups, sensors and intelligent sensors for measuring non-electrical variables, for example, mechanical, physical or chemical and/or electrical variables and/or lengths, masses, forces, temperatures, angles, radiation, light, substance composition, substance concentration, sound waves, moisture, pressures, expansions, turbidities, absorption spectra, fill levels, flow measurements and variables derived therefrom, and for measuring and/or checking components in active electronic circuits; and for measuring cross-talk, electromagnetic couplings and/or electromagnetic compatibility with the auxiliary variable being used to control an interference source or as interference signal and the signal at the interfered-with circuit or in the interfered-with channel serving as a measurement signal.

Due to the high resolution and accuracy of the measuring method according to the invention, sensors in which the electrical or magnetic field lies (in part) outside the space of the actual sensor element can also be used to electrically measure non-electric variables; electrical or magnetic changes of stray fields can also be utilized as effects being measured.

As a whole, the measuring method can generally be used for electrically measuring physical values which can be measured as a result of the action of an auxiliary variable or auxiliary energy, e.g. an electrical voltage and/or an electrical current, for a determination of resistance or the coil current or the magnetic field intensity for the measurement of magnetic-inductive flow. For this purpose, the auxiliary variable is realized so as to be switchable. During one measuring process, the auxiliary variable is switched at irregular intervals. Each one of the output values of the sensor element or measured value pickup can then be processed, for example with the aid of a single-chip microprocessor including an integrated analog/digital converter for all desired values of the auxiliary variable. Processing takes place by means of a modified correlation and it is possible, with the use of this method, to eliminate many interferences, such as, for example, humming influences, amplifier drift, temperature drift, etc. and thus to realize very accurate measuring instruments with the number of components and thus the costs being very low. These components can be reduced essentially to a switchable auxiliary energy source and a single-chip microprocessor. By integrating the digital evaluation device in the measured value pickup, highly accurate and inexpensive, intelligent sensors can be produced.

BRIEF DESCRIPTION OF THE DRAWINGS

The idea on which the invention is based will be described in further detail below with reference to an embodiment that is illustrated in the drawing. It is shown in:

FIG. 5, a block circuit diagram according to FIG. 1 with detailed illustration of the auxiliary variable generator for inductance measurements;

DETAILED DESCRIPTION OF THE PREFERRED EMBODIMENT

Figure 1:
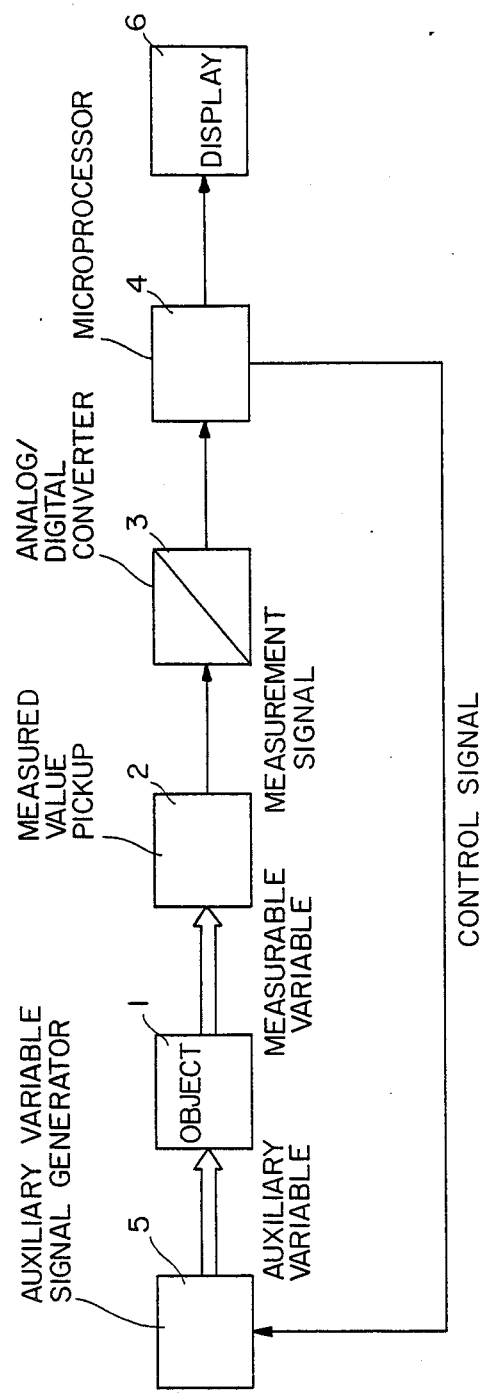
FIG. 1, a block circuit diagram for measuring the measurable variable of an object to be measured with the aid of a microprocessor.

The block circuit diagram shown in FIG. 1 shows any desired object (1), having a measureable variable to be measured on which acts an auxiliary variable signal furnished by an auxiliary variable generator (5). The auxiliary variable generator (5) is actuated by a control signal put out by a microprocessor (4) and additionally receives a reference signal put out by an analog/digital converter, or ADC (3) which receives at its input an analog measurement signal put out by a measured value pickup (2) coupled with the object (1) to be measured and which detects the measured value actuated by the auxiliary variable and is connected at its output with the microprocessor (4) so as to put out a digital signal corresponding to the analog measurement signal and with the auxiliary variable generator (5) to put out the reference signal.

The microprocessor (4) is additionally connected with a display (6) for directly displaying the measured value with the display being made subsequent to evaluation and calculation.

To measure the measurable characteristic of the object (1) being measured, the microprocessor (4) puts out a control signal for the auxiliary variable generator (5) which then applies an auxiliary variable signal to the object being measured, with the auxiliary variable signal taking on the time characteristic of a pseudo-random noise signal which is interrupted for a predeterminable time span after each measuring interval. The measured value pickup (2) which is coupled with the object (1) being measured emits a directly measurable analog signal to analog/digital converter (3), with the microprocessor (4) calculating the measurable variable of the object being measured from the auxiliary variable put out by auxiliary variable generator (5) or its desired values and the measurement signal furnished by measured value pickup (2).

Since the desired values of the auxiliary variable are known on the basis of the control signals emitted by the microprocessor (4), the components of the measurable variable or measurement signal resulting from the auxiliary variable can be filtered out and the measurable variable can be determined solely from the components of the measurement signal resulting from the auxiliary variable signal. For this purpose, the control signal emitted by microprocessor (4) is processed with the measurement signal into a resultant function similar to a cross-correlation function with the auxiliary variable and the function similar to the cross-correlation function being configured in such a manner that the effects produced by interfering offset variables on the resulting measurement are eliminated. The values of the function similar to a cross-correlation function employed for the calculation of the measurable variable are evaluated by the microprocessor in such a manner that a linear interference component contained in the measurement signal has no influence on the resulting measurement.

Advantageously, the measuring process is repeated several times in succession, and an average is calculated for the measurable variables resulting from each measuring process.

The auxiliary variable signal itself may be composed of a time discrete and/or amplitude discrete signal and also of a sequence of rectangular pulses of varying time duration and/or varying amplitudes. Advantageously, the auxiliary variable signal takes on the time characteristic of a digital, multi-stage pseudo-random signal or a noise-like signal which has a similar time characteristic as a multi-stage digital pseudo-noise signal if the latter is interrupted for a predeterminable period of time after each measuring interval.

As will be described in greater detail below with reference to a concrete embodiment, the auxiliary variable signal may be generated by changing the polarity and/or switching a constant value out or in. In that case, auxiliary variable signal generator (5) may be composed of one or a plurality of switches with which the reference voltages are switched.

The method according to the invention or the apparatus according to the invention can also be used instead of carrier frequency measuring bridges. In this case, the input variable of the object being measured is generated by the switchable auxiliary variable signal generator (5). The output signal from the object being measured is processed further as a directly measurable variable, with the synchronous rectification of the analog carrier frequency measuring bridge being replaced by digital measured value processing in the processor (4).

If the object being measured is composed of a capacitance, an inductance and/or a resistance, the auxiliary variable may either be a current through the object being measured or the voltage across the object being measured with the directly measurable variable being the current through the measuring object if the auxiliary variable is a voltage; otherwise, the directly measurable variable is a voltage. The impedance of the circuit can be determined from the measured values for the mentioned components. Compared to analog carrier frequency measuring bridges, it is possible, with the aid of the method according to the invention and the apparatus according to the invention, to perform a significantly simpler and thus more economical measurement signal evaluation with the same accuracy.

Figure 3:
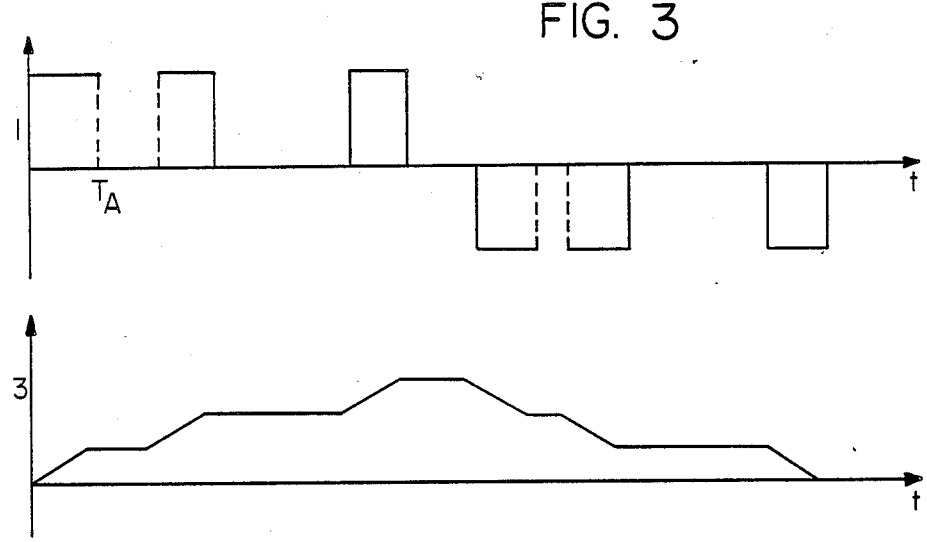
FIG. 3, an illustration of the time characteristic of the capacitor current and the capacitor voltage with the use of the measuring device of FIG. 2.

If the object being measured is composed of a storage component, such as a capacitance or inductance, an auxiliary variable signal as shown in FIG. 3 is advantageously employed. In this case, the auxiliary variable signal must not have too large an offset so that the conversion range of the analog/digital converter 3 is not exceeded.

To eliminate the influence of an interfering offset in the directly measurable variable on the resulting measurement, the control signal emitted by the microprocessor (4) to control the auxiliary variable signal generator (5) is used to calculate the resultant function similar to a cross-correlation function. Additionally, the measurable variable should take on only positive values, particularly for analog/digital converters having a positive conversion range, on the one hand, in order to utilize as best as possible the conversion range of the analog/digital converter and, on the other hand, not to leave the available conversion range of the analog/digital converter (3). The latter condition is particularly important in the measurement of electrolyte capacitors. Another requirement is that the auxiliary variable signal must be realizable as easily as possible.

To meet the above-mentioned requirements and additionally permit maximum interference suppression as well as simple programming of the microprocessor (4), the auxiliary variable signal is advantageously given a time characteristic as shown in FIG. 3. The time intervals shown in dashed lines can be utilized for measured value processing, i.e. for the computing time of microprocessor (4) and the conversion time required by analog/digital converter (3).

In addition to this configuration of the time variation of the auxiliary variable signal, the output signal of the switchable auxiliary variable signal generator (5), to be explained in greater detail below in conjunction with FIG. 2, may be a time discrete and/or amplitude discrete signal. Moreover, if the auxiliary variable signal generator (5) is switchable, the auxiliary variable signal may be composed of a sequence of rectangular pulses of varying time durations and/or varying amplitudes. A further possibility is to configure the output signal of the switchable auxiliary variable signal generator (5) as a digital, multistage, pseudo-random signal or as a noise-like signal which has a similar shape as a multi-stage, digital pseudo-noise signal if the latter is interrupted after each sampling interval for a fixed or variable signal time interval.

Finally, the auxiliary variable signal may also be composed of a noise-like signal which has a time characteristic similar to a multi-stage, digital pseudo-noise signal of maximum length and minimum duration if this signal is interrupted for a fixed or variable signal time interval after every measuring interval. Pseudo-random, digital noise signals having m amplitude stages can be obtained with the aid of feedback-connected n-stage shift registers having m amplitude quantizing stages. With suitable feedback connection of the shift registers, periodic pseudo-noise signals result which have a maximum period duration (length) of $m^n - 1$. If additionally, n is reasonably minimized, pseudo-random, digital noise signals of maximum length and minimum duration result; for m=3, i.e. three amplitude stages, n should be selected to equal 2.

This auxiliary variable signal can be generated by changing the polarity and/or switching off a constant auxiliary variable amplitude.

If the auxiliary variable signal is not known, it can be determined with sufficient accuracy by a measurement.

The use of the method according to the invention with a switchable auxiliary variable signal generator will be explained in greater detail with reference to the block circuit diagram shown in FIG. 2 for capacitance measurements in conjunction with the illustration over time of the capacitor current and capacitor voltage according to FIG. 3. In the circuit arrangement shown in FIG. 2, a capacitor current generated by the voltage controlled constant current source composed of resistors (R4, R5) and an amplifier (OP3) serves as the auxiliary variable signal.

The reference voltage UREF brought out of analog/digital converter (3) is applied to the voltage divider (R1), (R2) included in auxiliary variable signal generator (5) and is divided by means of the voltage divider in such a manner that the amplitude of voltage U1 across amplitude switching member (R4, R5) and switch (S4) takes on a desired value. The connection between the two resistors (R1, R2) of the voltage divider is applied, via a resistor (R3), to the inverting input of an operational amplifier (OP1) which is switched as an inverter and whose non-inverting input is connected to ground or to a reference potential while its output is fed back, via a resistor (R6) to the inverting input. Operational amplifier (OP1) makes available the negative amplitude of voltage U1. Operational amplifier (OP2), which is connected as an electrometer amplifier, prevents the voltage divider from being charged by the positive amplitude of voltage U1 and makes available its positive amplitude value.

Figure 9:
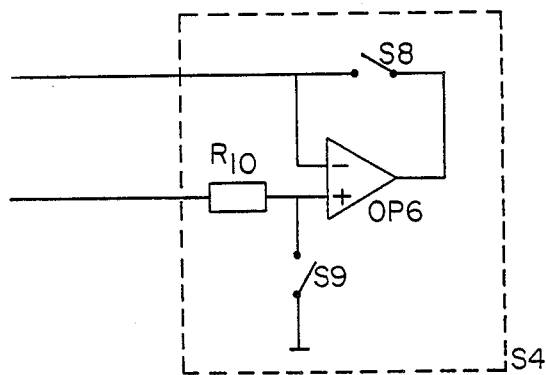
FIG. 9, the circuit of an analog switch which, in the switched-on state, has a negligible forward voltage.
Figure 10:
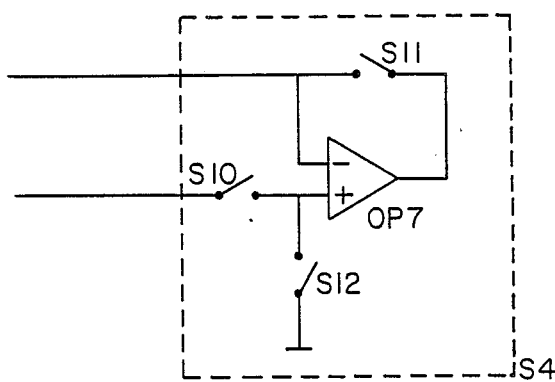
FIG. 10, the circuit of an analog switch which, in the switched-on state, has a negligibly low forward voltage and does not constitute a load on the signal source.

The outputs of the two operational amplifiers (OP1, OP2) are connected to these switches (S1, S2), which together with a further switch (S3) are configured as analog switches. They are actuated by the microprocessor (4) by means of the above-mentioned control signals so that the voltage U1, and thus also the capacitor current present at the output of voltage controlled constant current source (R4, R5) and (OP3) takes on the desired time characteristic as shown in FIG. 3. Resistors (R4) and (R5) of the amplitude switching member determine the possible amplitudes of the capacitor current, while they can be switched by means of a switch (S4). For this purpose, the switch (S4) must preferably be configured as shown in FIGS. 9 or 10 so that, in the switched-on state, the thus realized analog voltage switch exhibits practically no voltage drop.

The output voltage of the operational amplifier (OP3) of the voltage controlled constant current source is fed to analog-digital converter (3) with the voltage measured in this way not being the capacitor voltage at capacitor C, but the sum of the capacitor voltage and the offset voltage at capacitor C of operational amplifier (OP3). If this offset voltage is constant, which is the case as long as operational amplifier (OP3) does not leave its linear range, it has no influence, on the resulting measurement of the unknown capacitance Cx of the capacitor C.

Figure 2:
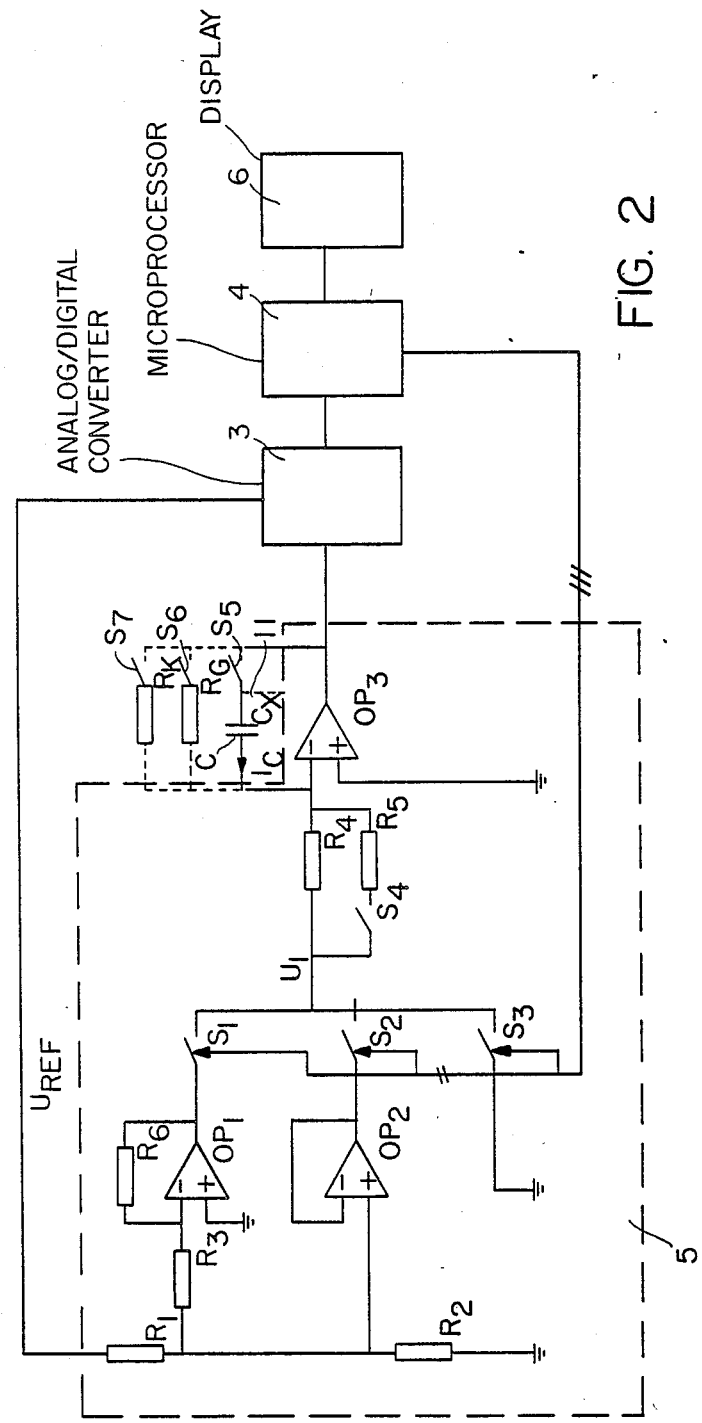
FIG. 2, a block circuit diagram according to FIG. 1 with detailed illustration of the auxiliary variable generator for capacitance measurements.

If one uses the reference voltage of the analog-digital converter to generate the capacitor current, as shown in FIG. 2, fluctuations in this voltage also have no influence on the resulting measurement.

The unknown capacitance Cx of the capacitor C being measured may be switched by way of a switch (S5) between the output of operational amplifier (OP3) and its inverting input. As an alternative, precision resistors (RG) and (RK) can be connected in the feedback line of operational amplifier (OP3) to thus calibrate the measuring instrument by measuring the current amplitude. Precision resistors (RG) and (RK) can be integrated in the measuring instrument to automatically calibrate it before each measurement. In this way, the effects produced by influences of fluctuations in the components due to temperature and time are eliminated so that no high accuracy requirements need be made for the resistors (R1) to (R5) of auxiliary variable signal generator (5).

The operation of the circuit arrangement according to FIG. 2 will now be described in connection with the illustration of the time characteristic of the capacitor current and the capacitor voltage if the current is interrupted during the analog-digital conversion and the calculation of the resultant function is similar to a cross-correlation function.

At the start of the measurement, the capacitor voltage to be measured is set to a low, positive value by charging the capacitance with corresponding current pulses. It is not set to "zero" so that negative offset currents cannot lead to negative voltages. For the voltage to be converted to utilize the conversion range of the analog/digital converter (3) as fully as possible, its maximum value should be somewhat less than the reference voltage. To realize this, the duration of the individual current pulses $T_A$ is adapted to the capacitance to be measured. For this purpose, current pulses of a minimum duration $T_{A\,MIN}$ are impressed on the capacitance until the voltage to be measured reaches one-quarter of the reference voltage. The time $T_A$ is then determined from the number Z of these current pulses:

$$T_A = Z \cdot T_{A\,MIN} \qquad (1)$$

In this way, it is ensured that the maximum voltage to be measured is about 75% of the reference voltage. The remaining 25% of the voltage range permit the measurement of interfered-with voltages.

If the number Z of current pulses becomes so large that the measuring period would exceed one second, the current amplitude is switched to a greater value by means of switch (S4), and the number Z is redetermined.

For a determination of the capacitance value, one starts with a statement known from system identification:

$$\phi_{iu}(\tau) = g(\tau) * \phi_{ii}(\tau), \qquad (2)$$

where $\phi_{iu}(\tau)$ is the cross-correlation function (CCF) between capacitor current and capacitor voltage;

$g(\tau)$ is the weighting function (unit pulse response);

$\phi_{ii}(\tau)$ is the autocorrelation function (ACF) of the capacitor current; and "*" stands for the convolution integral.

If one considers only the parts of the capacitor current for the connections shown in solid lines in FIG. 2, its ACF is a periodic sequence of positive and negative Dirac pulses. If one additionally considers that the CCF has a periodic characteristic and takes on either a positive or a negative value of equal magnitude, the following relationship results with observation of the known relationships between $g(\tau)$ and the capacitance:

$$C_x = \frac{1}{2} \cdot \frac{\phi_{ii}(-4T_A) \cdot T_A}{\phi_{iu}(\tau)} \; ; \; -3T \leqq \tau \geqq 0. \qquad (3)$$

If one determines the CCF for negative shifts, it can be obtained from so many measured values as correspond to one period of the capacitor current. Thus, no further measured values are required to perform the shifts.

In this case, the change in signs in the CCF is compensated by that in the ACF. This saves time compared to determination of the CCF for positive shifts because the capacitor current is assumed to be known.

Since the capacitor current is able to take on only the values $+I_C$, $-I_C$ and ZERO, the cross-correlation can be traced back to additions and subtractions.

The capacitor current can be described by sequence (4) which represents one period:

$$I_C = I_C \cdot \{1, 1, 0, 1, -1, -1, 0, -1\}. \qquad (4)$$

The value of the capacitance $C_x$ to be measured can be determined from a constant $K_O$, which contains, inter alia, the fixed value of the ACF, and from the sampling time $T_A$ and the value of the CCF $\phi_{xy}(\tau)$:

$$C_x = K_0 \cdot \frac{T_A}{\phi_{xy}(\tau)} \; ; \; 0 \leqq \tau \geqq 3T_A \qquad (5)$$

In the embodiment described here, the capacitance Cx was determined by replacing, in Equation (5), the function $\phi_{xy}(\tau)$ by its average value for the shifts $\tau 1$ and 3.

The function $\phi_{xy}(\tau)$ can be determined at a glance from a table:

TABLE 1

Determination of the resultant function similar to a cross-correlation function

| X(t) | Y(t + τ) | | | |
|------|---|---|---|---|
|      | τ = 0 | τ = 1 | τ = 2 | τ = 3 |
| X0 | 1 | 1 | 0 | 1 |
| X1 | 1 | 0 | 1 | −1 |
| X2 | 0 | 1 | −1 | −1 |
| X3 | 1 | −1 | −1 | 0 |
| X4 | −1 | −1 | 0 | −1 |
| X5 | −1 | 0 | −1 | 1 |
| X6 | 0 | −1 | 1 | 1 |
| X7 | −1 | 1 | 1 | 0 |

From Table 1, the following results for $\phi_{xy}(\tau)$:

$$\phi_{xy}(\tau = 0) = X0 + X1 + X3 - X4 - X5 - X7 \qquad (6)$$

$$\phi_{xy}(\tau = 1) = X0 + X2 + X7 - X3 - X4 - X6$$

$$\phi_{xy}(\tau = 2) = X1 + X6 + X7 - X2 - X3 - X5$$

$$\phi_{xy}(\tau = 3) = X0 + X5 + X6 - X1 - X2 - X4$$

These values of function $\phi_{xy}(\tau)$ are equal to one another. No determination of function $\phi_{oxy}(\tau)$ for other values of $\tau$ is made since the function is a periodic function.

As can be seen in Table 1 in connection with Equation (6), an offset which could be superposed on values Xi does not change the resulting measurement.

If the two amplitudes of voltage $U_1$ are not identical, this will produce an offset which is integrated in the measured voltage and thus constitutes an interference component which is linear over time in the directly measurable variable. This linear component can be easily described if one adds the value i.K to the Xi values of the table.

As a deviation from Equation (6), the following results:

$$\Delta\phi_{xy}(\tau = 0) = 1 + 3 - 4 - 5 - 7 = -12, \qquad (7)$$

$$\Delta\phi_{xy}(\tau = 1) = 2 + 7 - 3 - 4 - 6 = -4,$$

$$\Delta\phi_{xy}(\tau = 2) = 1 + 6 + 7 - 2 - 3 - 5 = 4, \text{ and}$$

$$\Delta\phi_{xy}(\tau = 3) = 5 + 6 - 1 - 2 - 4 = 4.$$

If the digitalization errors marked Fi in the ADC3 lie in a range from 0 to +1 LSB, the following deviations result compared to Equation (6) with it having been considered that X1, X6 and X7, as well as X2, X3 and X5 are equal to one another in the uninterfered-with case.

$$\Delta\phi_{xy}(\tau = 0) = F0 + F1 + F3 - F4 - F5 - F7 = F0 - F4 \quad (8)$$

$$\Delta\phi_{xy}(\tau = 1) = F0 + F2 + F7 - F3 - F4 - F6 = F0 - F4$$

$$\Delta\phi_{xy}(\tau = 2) = F1 + F6 + F7 - F2 - F3 - F5$$

$$\Delta\phi_{xy}(\tau = 3) = F0 + F5 + F6 - F1 - F2 - F4 = F0 - F4$$

As indicated by Equation (8), the error is the same at $\tau=0, 1, 3$ and is a maximum of $\pm 1$ LSB. At point $\tau=2$ it is a maximum of $\pm 3$ LSB. To minimize the effect of digitalization errors, only the values of the resultant function similar to a cross-correlation function at shifts $\tau=1$ and $\tau=3$ are averaged to eliminate a linear interference component. If the digitalization error is $\pm\frac{1}{2}$ LSB, it can be transferred into the range from 0 to $+1$ LSB by adding $+\frac{1}{2}$ LSB. The effects of a linear interference component on the resulting measurement are likewise eliminated if the interference component has a characteristic which descends with increasing time.

The accuracy of the capacitance measuring device according to the invention is determined essentially by the resolution of the ADC3 and the accuracy of the resistors. The high accuracy requirements of resistors (R1) to (R6) can be omitted if a measuring resistor is used for calibration in that the current amplitude is measured with the aid of this measuring resistor. The measuring resistor can be integrated into the measuring instrument to thus automatically calibrate the measuring instrument before each measurement. This also eliminates the effects of component fluctuations due to temperature and time.

In this embodiment, the effects of these changes were compensated by calibration to a standard capacitance.

The errors in time $T_A$ can be neglected if an accurate quartz crystal is used to clock the calculating unit. If the voltage to be measured is subjected to such a great interference that the conversion range of the ADC3 is exceeded, this error is detected, and the measurement is restarted. Since the suppression of the effects of stray interferences and the elimination of offset effects occurs not only in the measurement of capacitances but also in all other measurements in which the variable signal to be determined is determined by means of a suitably formed auxiliary variable, an arrangement is thus available for measuring almost all electric and nonelectric variables with good interference suppression being ensured. Moreover, in cases in which an offset is integrated, the influence of the resulting linear components on the resulting measurement is eliminated.

Figure 4:
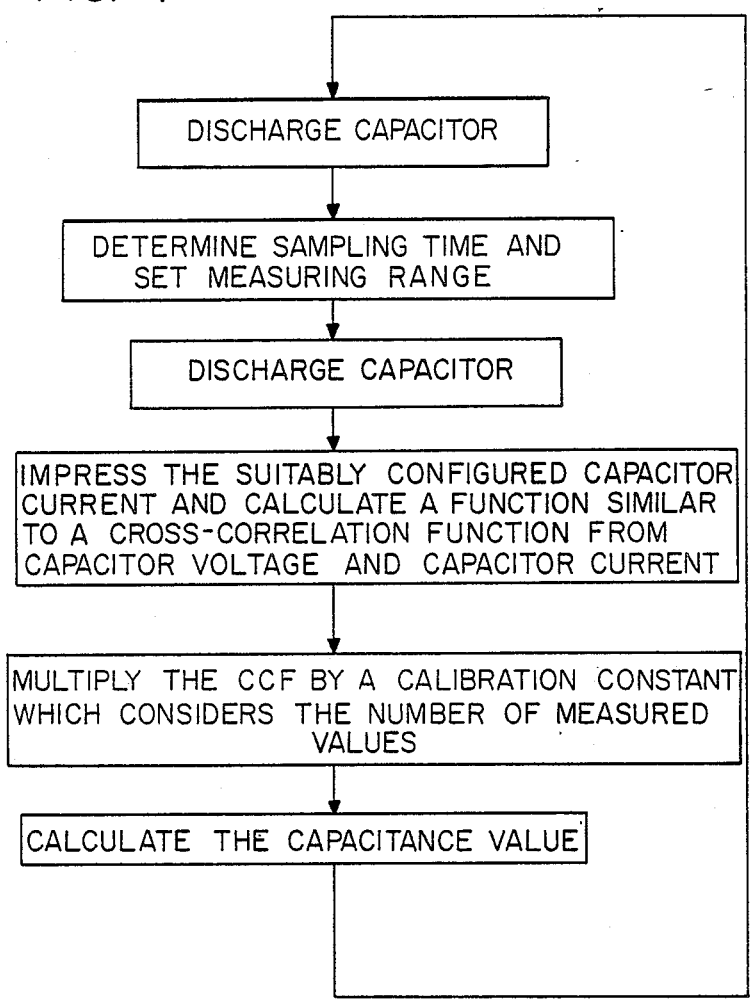
FIGS. 4 AND 4A-4D flow diagrams to explain the capacitance measurement with the use of the apparatus shown in FIG. 2.
Figure 4A:
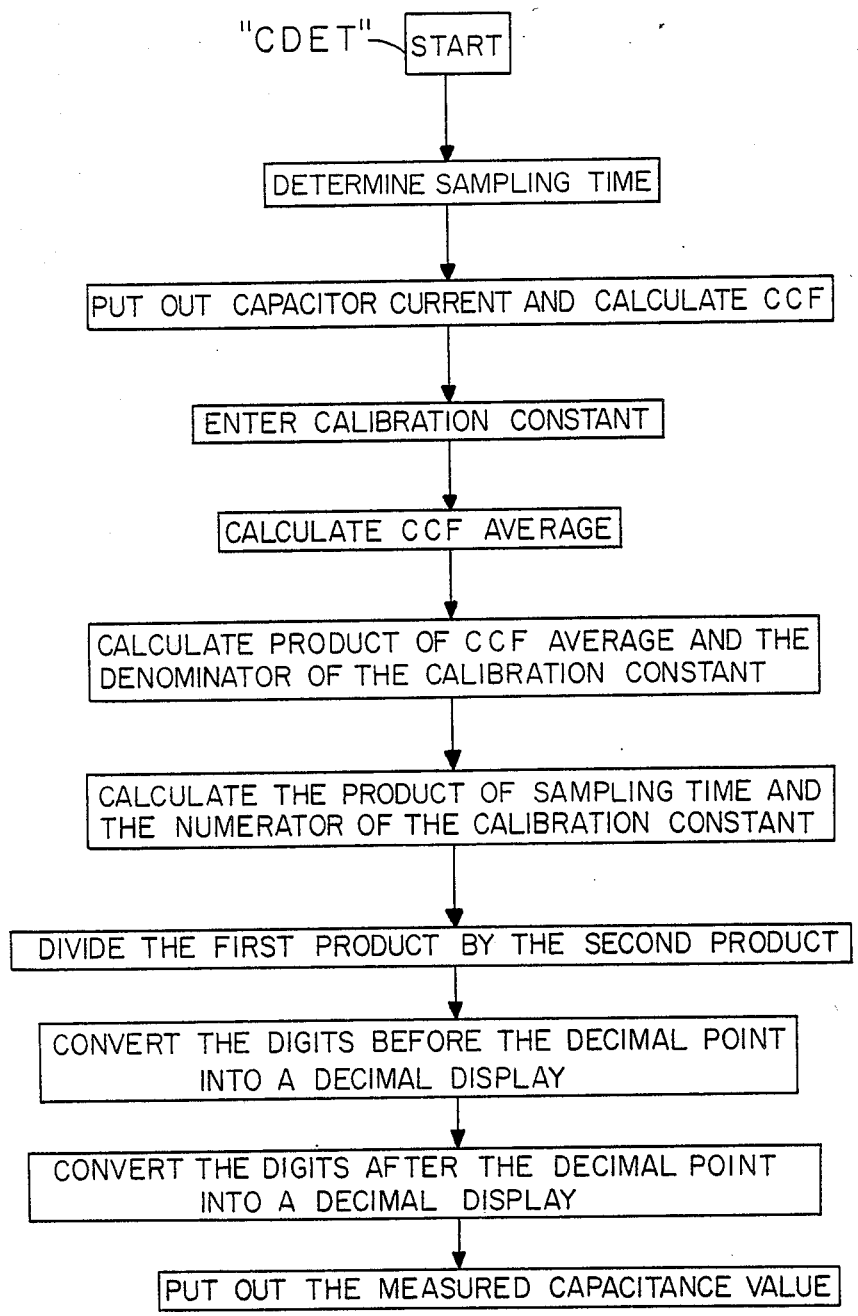
Figure 4B:
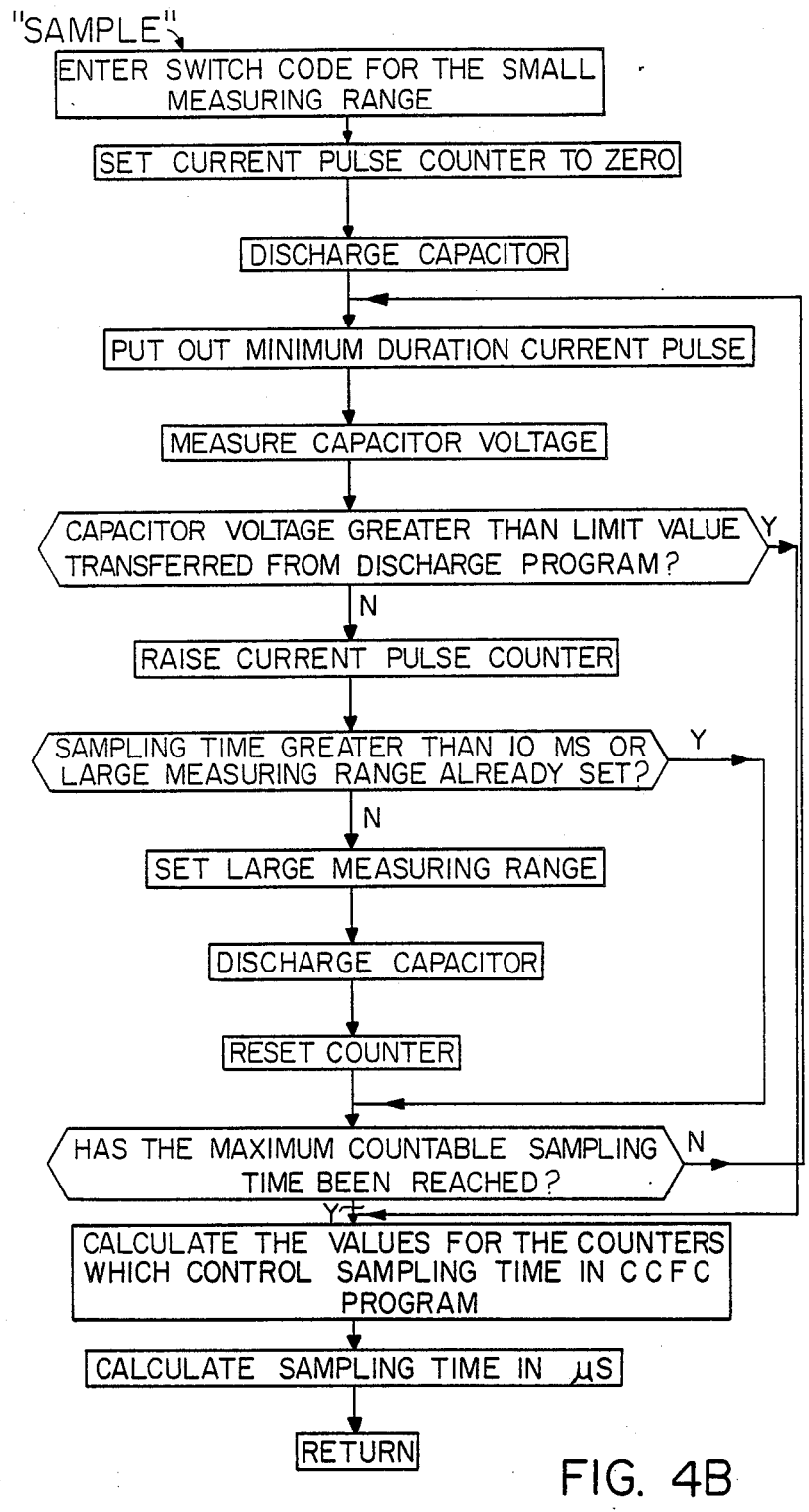
Figure 4C:
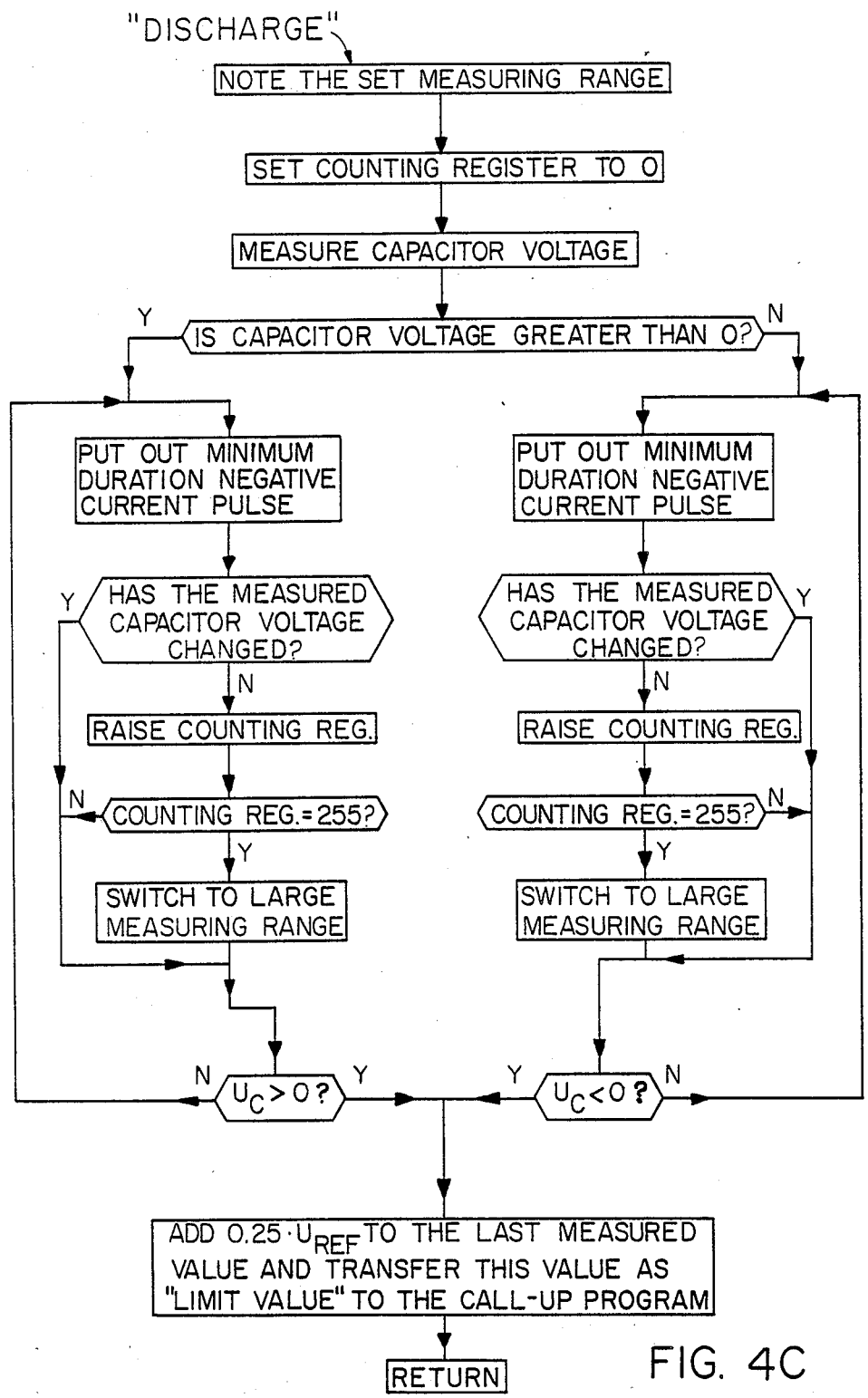

To produce the desired capacitor current, switches (S1) to (S3) must be controlled in a suitable manner by means of the control signal put out by the microprocessor (4). Moreover the resultant function similar to a cross-correlation function between the measured values for the capacitor voltage and the desired values for the capacitor current must be determined to calculate the capacitance value therefrom. The software required for this purpose is shown in the flow diagram of FIG. 4 with the Reset process being followed by the control program CDET (FIG. 4a) which first calls up the SAMPLE program (FIG. 4B). This program in turn initiates discharging of the capacitor and the determination of its voltage value in that it calls up the DISCHARGE program (FIG. 4C). Then, it adapts the sampling time to the capacitor to be measured and transfers the set measuring range and the determined sampling time to control program CDET (FIG. 4A).

This program now starts the routine CCFC (FIG. 4D) and transfers to it the set measuring range and the adapted sampling time. The routine CCFC controls the current source in such a manner that a desired current flows into the capacitor and monitors the analog/digital conversions. Additionally, it calculates the resultant function similar to a cross-correlation function between the desired values for the capacitor current and the values measured for the capacitor voltage.

Once the resultant function similar to a cross-correlation function has been determined from 160 measured values, the CDET control program determines the capacitance value with the aid of arithmetic programs. Before the measuring cycle begins again, control program CDET transfers the measured capacitance value to an output program which displays this measured value. The control program CDET shown in FIG. 4A is used to control the position of switches (S1) to (S3), measure the capacitor voltage and calculate the capacitance value. To make the sequence clearer, the program is designed as a control program with the actual functions being performed in subprograms.

One of these subprograms is the SAMPLE program of FIG. 4B with which the sampling time and the capacitance range are determined. A further subprogram is the DISCHARGE program according to FIG. 4C with the aid of which the capacitance is discharged.

Figure 4D:
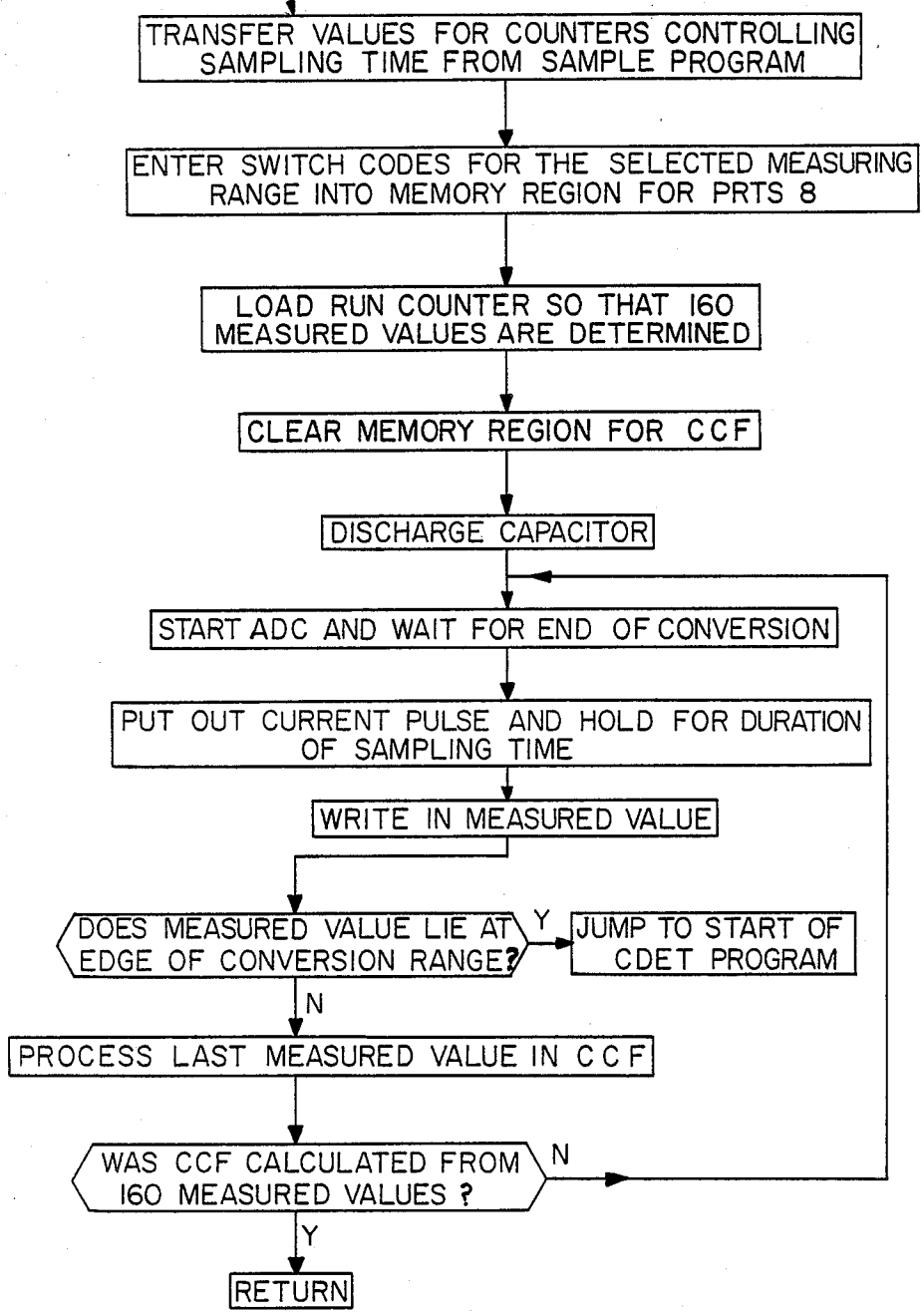

The CCFC program according to FIG. 4D controls the capacitor current in the desired form and calculates the resultant function similar to a cross-correlation function. The further subprograms are not shown in detail since they are the known subtraction, addition, multiplication and division programs.

FIG. 5 shows as a further embodiment the block circuit diagram of a circuit for determining an unknown inductance Lx of an inductor L, and which, analogously to the block circuit diagram according to FIGS. 1 and 2, includes an analog/digital converter (3), a microprocessor (4) and a display device (6).

The auxiliary variable signal generator (5), likewise, includes a voltage divider (R1, R2) to which is applied the reference voltage $U_{ref}$ coming from analog/digital converter (3). The inverting input of a first operational amplifier (OP1) is connected, via a resistor (R3) to the connection of the two voltage divider resistors (R1, R2) and, via a resistor (R6), to the output of the operational amplifier (OP1). The noninverting The noninverting input of the first operational amplifier is connected to ground or a reference potential, respectively. A second operational amplifier (OP2) is connected, analogously to the circuit arrangement of FIG. 2, as an inverting amplifier having a gain of "1", with its inverting input being connected to the connection between the two voltage divider resistors (RI, R2) and its inverting input being connected to its output. Three switches (S1, S2, S3) arranged as analog switches, of which the last-mentioned switch (S3) is connected to ground or reference potential, are actuated in the above-described manner by means of control signals emitted by the microprocessor (4).

Switches (S1) in parallel with the inductor L having inductance (S3) are connected to Lx, which is the object having the measurable quantity to be measured, whose other terminal is connected to the inverting input of operational amplifier (OP3). Resistors (R11, R12), which together with switch (S13) form an amplitude switching member, are disposed in the feedback line of operational amplifier (OP3). Resistors (Rg1) and (Rk1) serve as calibrating members.

A special calculation of the values of the resultant function similar to a cross-correlation function or of the cross-correlation function can be omitted when measuring objects capable of storage are employed if the measurement signal or, more precisely, the variable signal to be measured directly does not contain a linear component which could lead to measuring errors.

Since for a resistance measurement the resultant function similar to a cross-correlation function, in the ideal case and in the range under consideration, is composed of only a single value which is unequal to "zero", the function values need not be averaged.

If the structure of a network composed of resistors, capacitances and inductances is known, the total resistance, total inductance, total capacitance and the impedance of the network can be determined on the basis of generally known relationships.

If the circuit is used to measure voltage and current, a direct voltage to be measured is changed in polarity and switched off in such a manner that the voltage across the measuring instrument takes on the above-described characteristic. This voltage can now be supplied directly to the analog/digital converter (3). To measure very small direct voltages or currents, the voltage to be measured can impress a current, via a resistor, and a reversing integrator, into the known capacitance of the integrator, in which case the capacitor voltage or a voltage connected therewith is subjected to analog/digital conversion. A current to be measured can be integrated directly. The measurement of alternating voltages can be performed, for example, in such a manner that the alternating voltage is rectified and then the direct voltage is measured. A current measurement can be reduced, for example by way of a resistor, to a voltage measurement.

As is generally known, a force acts on a charged particle in an electric field and, if the particle is moved, also in a magnetic field. By way of the configuration of the electrical or magnetic field, it is possible to utilize the device also to measure the effects produced by these fields and the variables to be derived therefrom.

An example for this is the magnetic-inductive flow measurement. The magnetic field may here be controlled according to the above-described time characteristic. A further example for use is the measurement of flow in which the auxiliary variable signal is a voltage and/or an electrical field intensity which polarizes, ionizes, aligns and/or deflects particles which may be ionized and/or polarized so that the measurement signal or the variable signal to be measured directly appears as a voltage, charge, true electric power, field intensity and/or change in capacitance which is a function of flow.

Many non-electrical variables, such as, for example, geometric variables or variables which cause changes in the dielectric constant, specific conductivity or permeability number, can be determined by way of changes in an electrical or magnetic field and thus also by way of the determination of capacitances, resistances or inductances. Due to the high resolution and accuracy of the measuring method according to the invention, sensors can also be realized in which the electrical or magnetic field lies (in part) outside the space of the sensor element. Electrical or magnetic changes in stray fields can also be utilized as measuring effects.

A further use for the invention appears in the measurement of magnetic fields by means of Hall sensors, in which the current flowing through the Hall element can be configured in the manner described above.

The above-described device can also be used for flow measurements according to the Coriolis method, in which case there are two possible uses. Firstly, the mechanical oscillation which generates the Coriolis force may have the above-described time characteristic: secondly, the force pickup may be designed according to the above-described method. For example, the current in a strain gauge can be considered as an auxiliary variable signal and may be configured in a corresponding manner. The two possible applications may, of course, be combined.

A significant advantage of the method according to the invention and of the apparatus for implementing the method resides in the simple and inexpensive realization of a highly accurate measuring instrument.

The claimed device does not have the drawbacks of prior art bridge circuits since, firstly, no matching is required and, secondly, no sinusoidal auxiliary variables need be employed. The problems of frequency stabilization occur practically not at all since the necessary, different time durations can be determined with quartz accuracy. If an offset occurs in the variable signal to be measured directly or in the measurement signal and/or a linear interference component, its effects on the resulting measurement are eliminated. That means that the auxiliary variables may oscillate about an average value without influencing the resulting measurement and the auxiliary variable generator can thus be realized in a cost-efficient manner. A further advantage of the solution according to the invention is that no long measuring periods occur since the amplitude of the auxiliary variable signal can be adapted to the object to be measured. Additionally, it is ensured that the effects of occurring stray interference variables on the resulting measurement are suppressed to a considerable degree.

Even interferences in the variable signal to be measured directly or in the measurement signal caused by the circuit itself, which have the same characteristic as the auxiliary variable, do not falsify the resulting measurement for measured objects which are capable of storage.

Due to the large number of measured values which are utilized to determine the indirectly measured variable, the effects of digitalization errors of the measuring reactance are minimized by their averaging.

Since the actual determination of the variable signal to be measured occurs digitally, it is possible to determine the values of the lines between measuring instrument and object being measured before the actual measurement is made to later consider them automatically.

Due to the small number of components employed which, in addition, are frequently used, and thus inexpensive, parts, and inexpensive measuring instruments can be produced which have an accuracy in a range of that of carrier frequency measuring bridges. Since the accuracy almost exclusively depends on the resolution of the analog/digital converter and the accuracy of the calibrating resistors, it can, moreover, be augmented in a very simple manner.

Additionally, the arrangement can be miniaturized and can thus be integrated in sensors. Since a microprocessor is included in the arrangement, it is for use possible to the inventive arrangement in intelligent sensors.

Figure 6:
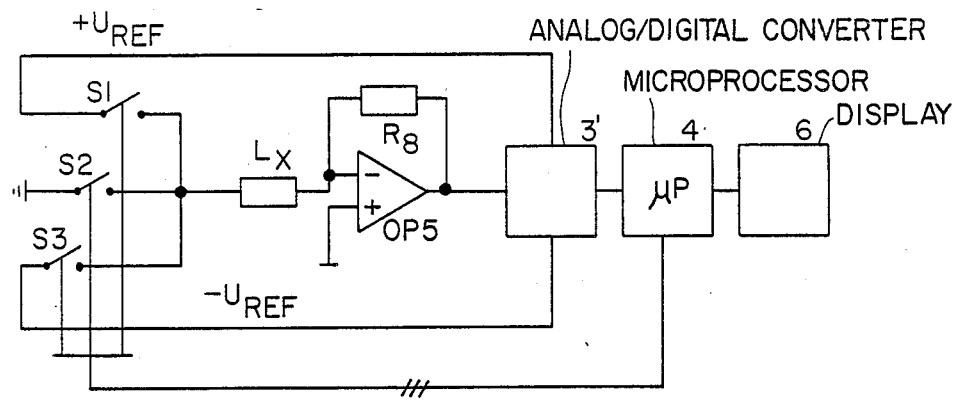
FIG. 6, a simplified circuit for inductance measurements according to FIG. 5.
Figure 7:
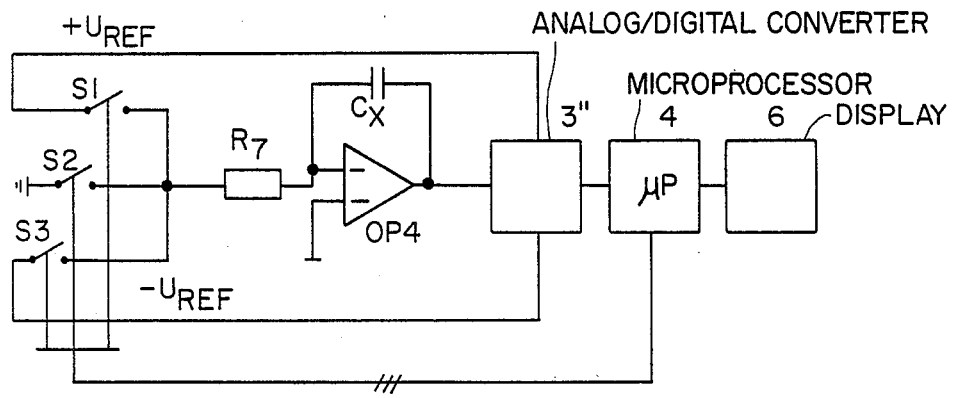
FIG. 7, a simplified circuit for capacitance measurements according to FIG. 2.
Figure 8:
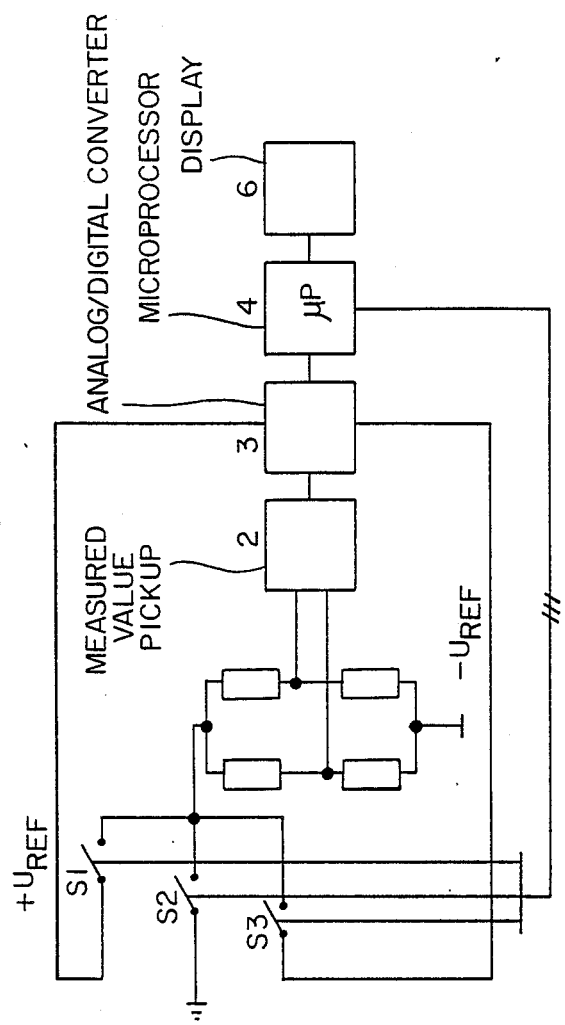
FIG. 8, a simplified circuit for measuring a bridge voltage with the bridge possibly being contained, for example, in a piezoresistive pressure sensor.

FIGS. 6 and 7 show simplified circuit arrangements for the determination of inductances and capacitances. Under certain conditions, these devices may replace the devices shown in FIGS. 2 and 5. To do this, it is merely necessary for analog/digital converter (3') in FIG. 6 and (3") in FIG. 7 to emit a positive as well as a negative reference voltage $+U_{REF}$, $-U_{REF}$. In this case, the first amplifier (OP1) may be omitted. The voltage divider including voltage divider resistors (R1, R2) is often not necessary so that the separating amplifier (OP2) can also be omitted.

This results in the circuit arrangement for inductance measurements shown in FIG. 6 in which a positive reference voltage $+U_{REF}$ is applied to a first switch (S1) and a negative reference voltage $-U_{REF}$ is applied to a third switch (S3), both voltages being furnished by analog/digital converter (3'). A second switch (S2) is connected to ground or a reference potential, respectively.

Switches (S1) to (S3) are actuated, analogously to the above-described embodiments, by way of control signals emitted by microprocessor (4) and apply corresponding voltages to inductance Lx whose output measurement signals are detected by analog/digital converter (3') and forwarded to microprocessor (4) which, after performing the calculation described above, displays the measured variable signal on display device (6). The resistor (R8) provided in FIG. 6 here serves as a current measuring resistor.

Analogously to the simplified circuit arrangement of FIG. 6, a simplified circuit arrangement for determining capacitance can be provided under the above-described conditions as shown in FIG. 7, in which case the inductance Lx to be measured and the current measuring resistor (R8) are replaced by a constant current source composed of a resistor (R7) and an operational amplifier (OP4) and the capacitance Cx to be determined.

We claim:

1. Method of measuring a measurable characteristic of an object in which the measurable characteristic of the object has a value which is sensed by a sensor element which emits an analog sensor output signal to a processor, the sensor output signal corresponding to the measurable characteristic of the object, based on the applied auxiliary variable signal and the sensor output signal corresponding to the measurable characteristic, comprising the steps of:

supplying an auxiliary variable signal to the object from a controllable auxiliary variable signal generator, in which said auxiliary variable signal has a controllable time characteristic, said controllable auxiliary variable generator being controlled by a control signal emitted by the processor, and said auxiliary variable signal is interrupted for a selected time span after each measuring interval;

sensing the measurable characteristic of the object using the sensor element;

supplying the signal emitted by said sensor element to said processor as a digitalized measurement signal via an analog/digital converter; and filtering out, using said processor, components or said measurable signal emitted by said sensor element which are caused by said auxiliary variable signal by processing of said control signal emitted by said processor to control said controllable auxiliary variable signal generator together with said signal emitted by said sensor element to form a resultant function with the auxiliary variable signal and the function similar to a cross-correlation function being such that the effects of said auxiliary signal on said measurable characteristic of the object detected by said sensor element are eliminated;

determining, using said processor, an accurate value of said measurable characteristic of the object based on the applied auxiliary variable signal and said resultant function such that effects produced by a linear noise component in said measurable characteristic of the object signal on the resulting determined value of said measurable characteristic are eliminated and the influence of digitalization errors on the resulting determined values of said measurable characteristic are minimized.

2. Method according to claim 1, further comprising repeating each of the steps a plurality of times and averaging the resulting plurality of determined values.

3. Method according to claim 1, wherein said auxiliary variable signal is at least one of time discrete and amplitude discrete.

4. Method according to claim 1, wherein said auxiliary variable signal is composed of at least one of a sequence of rectangular pulses of different time duration and a sequence of rectangular pulses of different amplitude.

5. Method according to claim 1, wherein said auxiliary variable signal has a time characteristic corresponding to that of a digital, multi-stage pseudo-random signal.

6. Method according to claim 1, wherein said auxiliary variable signal has a time characteristic similar to that of a multi-stage, digital, pseudo-noise signal which is interrupted after each measuring interval for a predeterminable period of time.

7. Method according to claim 1, wherein said auxiliary variable signal has a time characteristic corresponding to that of a digital, multi-stage, ternary pseudo-random signal of maximum length and minimum duration.

8. Method according to claim 1, wherein said auxiliary variable signal has a time characteristic corresponding to that of a multi-frequency, digital multi-stage signal.

9. Method according to claim 1, wherein said auxiliary variable signal is generated from said controllable auxiliary variable signal generator by at least one of changing the polarity of a supply voltage and switching out of a supply voltage.

10. Method according to claim 1, wherein said amplitude of said auxiliary variable signal is obtained from a reference voltage of said analog/digital converter.

11. Method according to claim 1, wherein said measurable characteristic of the object includes capacitance, inductance, resistance, and impedance; said auxiliary variable signal is a current flowing through the object being measured and said measured characteristic is a voltage applied across the object being measured.

12. Method according to claim 1, wherein said measurable characteristic of the object includes, inductance, resistance, and impedance; said auxiliary variable signal is a voltage applied to the object being measured and said measured characteristic is a current flowing through the object being measured.

13. Method according to claim 1, wherein, in said step of supplying an auxiliary variable signal, using bridge circuits, and providing a supply voltage for said measuring bridge from said auxiliary variable signal generator; and wherein said measured characteristic of the object is represented by the voltage of said bridge.

14. Method according to claim 1, wherein the object having said measurable characteristic is a structural component which is part of an active, electronic circuit.

15. Method according to claim 1, further comprising analyzing said resultant function and said auxiliary variable signal to determine at least one of cross-talk, electromagnetic couplings, and electromagnetic compatibility, with said auxiliary variable signal being utilized to control a noise source, and said signal from said sensor which represents said measurable characteristic of the object corresponding to an interfered-with circuit, and wherein said signal sensed by said sensor element from said interfered-with circuit has a pseudo-random characteristic.

16. Method according to claim 1 wherein said measurable characteristic of the object includes electrical and non-electrical variables, including variables which are capacitive, inductive, resistive, magnetic, electrical, optical, mechanical, physical, chemical, lengths, densities, masses, forces, temperatures, angles, radiation, light, substance concentration, substance composition, sound waves, moisture, pressures, expansion, turbidities, absorption spectra, fill levels, flow rate measurements and variables derived therefrom.

17. Apparatus for measuring a measurable characteristic of an object, comprising:
a sensor element which emits an analog sensor output signal, said sensor output signal corresponding to the measurable characteristic of the object;
an analog/digital converter for converting analog signals from said sensor element into digital output signals;
processor means receiving said digital output signals, and supplying a control signal to said controllable auxiliary variable signal generator, said controllable auxiliary variable signal generator being controlled by said control signal emitted by said processor, said auxiliary variable signal being interrupted for a selected time span after each measuring interval; said processor means filtering out components of said measurable signal emitted by said sensor element which are caused by said auxiliary variable signal by analyzing said signal produced by said controllable auxiliary variable signal generator together with said output signals from said analog/digital converter to form a resultant function; whereby said processor determines an accurate value of said measurable characteristic of the object based on the applied auxiliary variable signal and said resultant function such that effects produced by a linear noise component in said measurable characteristic of the object signal on the resulting determined values of said measurable characteristic are eliminated and the influences of digitalization errors on the resulting determined value of said measurable characteristic are minimized;
wherein said processor is a microprocessor whose output is connected with a display unit and with said auxiliary variable signal generator so as to feed control signals to said auxiliary variable signal generator; wherein said output of said auxiliary variable signal generator feeds said auxiliary variable signal to the object being measured which is connected with said sensor element for picking up said measured value.

18. Apparatus according to claim 17, wherein said measurable characteristic of the object is capacitance, and wherein said auxiliary variable signal generator includes three switches of which said first switch is connected to a positive reference voltage, said second switch is connected to a reference potential and said third switch is connected to a negative reference voltage, with said positive and negative reference voltages being furnished by said analog/digital converter;
the interconnected outputs of said switches are connected via a resistor with said inverting input of an operational amplifier whose non-inverting input is connected to said reference potential and whose output is connected, via said capacitance which is to be determined, with its inverting input and said output of said operational amplifier is connected with an input of said analog/digital converter, with said switches being actuated by said control signals emitted by said microprocessor.

19. Apparatus according to claim 17, wherein said auxiliary variable signal generator includes three switches of which said first switch is connected to a positive reference voltage, said second switch is connected to a ground or reference potential and said third switch is connected to a negative reference voltage, with said positive and negative reference voltages being furnished by said analog/digital converter;
the interconnected outputs of said switches are connected via an inductance to be measured with said inverting input of an amplifier whose non-inverting input is connected to ground or a reference potential and whose output is connected, via a resistor, with its inverting input and said output of said operational amplifier is connected with an input of said analog/digital converter, with said switches being actuated by means of said control signal emitted by said microprocessor.

20. Apparatus according to claim 18, further comprising the step of changing measuring range of signals measurable by said auxiliary variable signal generator for measuring the capacitance of the object using further resistors connected in parallel with said resistors, and switching with the aid of said analog switches with a very low forward voltage, wherein said analog switches are composed of an operational amplifier including an analog switch in a feedback connection; wherein, in a switched-on state, said input signal is applied to said non-inverting input of said operational amplifier and said analog switch in a feedback line of said operational amplifier is closed so that said input signal produces said output signal at said inverting input; in a switched-off state, said non-inverting input is connected to a reference potential, via a second analog switch, with said analog switch being open so that said output signal of said analog switch at said inverting input of said operational amplifier is independent of said input signal.

21. Apparatus according to claim 17, wherein said auxiliary variable signal generator includes three switches of which said first switch is connected to a positive reference voltage, said second switch is connected to a ground or reference potential and said third switch is connected to a negative reference voltage, with said positive and negative reference voltages being furnished by said analog/digital converter; said interconnected outputs of said switches are connected to a measuring bridge as a supply voltage; wherein said bridge voltage is connected, via said sensor element with an input of said analog/digital converter; said switches being actuated by means of control signals emitted by said microprocessor.

22. Apparatus according to claim 17 used as a digital substitute for analog carrier frequency measuring bridges and measuring amplifiers.

23. Apparatus according to claim 17, wherein, for the electrical measurement of non-electrical variables, at least one of said auxiliary variable signal and said measured variable signal are non-electrical variables.

* * * * *